Feb. 28, 1956 J. NAAB 2,736,625
COMPRESSOR PISTON CONSTRUCTION
Filed May 4, 1953

INVENTOR
JULIUS NAAB
BY
HIS ATTORNEY

United States Patent Office 2,736,625
Patented Feb. 28, 1956

2,736,625

COMPRESSOR PISTON CONSTRUCTION

Julius Naab, Easton, Pa., assignor to Ingersoll-Rand Company, New York, N. Y., a corporation of New Jersey Application May 4, 1953, Serial No. 352,619

3 Claims. (Cl. 309—4)

The invention relates to compressor pistons and more particularly to pistons of the non-lubricated type.

In many food processing plants compressed air is required in the preparation of the food. In order to eliminate the danger of oil getting into the food a non-lubricated compressor is used to provide the compressed air. In compressors of this type it is customary to provide the piston with carbon wearing and piston rings. It sometimes happens that the carbon piston rings wear out and the metal expander rings, which urge the piston rings into contact with the cylinder walls, rub against the cylinder thereby scoring it. When this happens it becomes necessary to take the compressor out of service for a considerable period of time while the damage is repaired. Such delays are often very costly.

It is, therefore, an object of the applicant's invention to provide a non-lubricated compressor with suitable sealing means between the piston and the cylinder wall.

A further object of the invention is to construct the sealing means so as to eliminate the danger of scoring of the cylinder wall in case the piston rings wear out.

Further objects will be in part obvious and in part pointed out hereafter.

Figure 1:
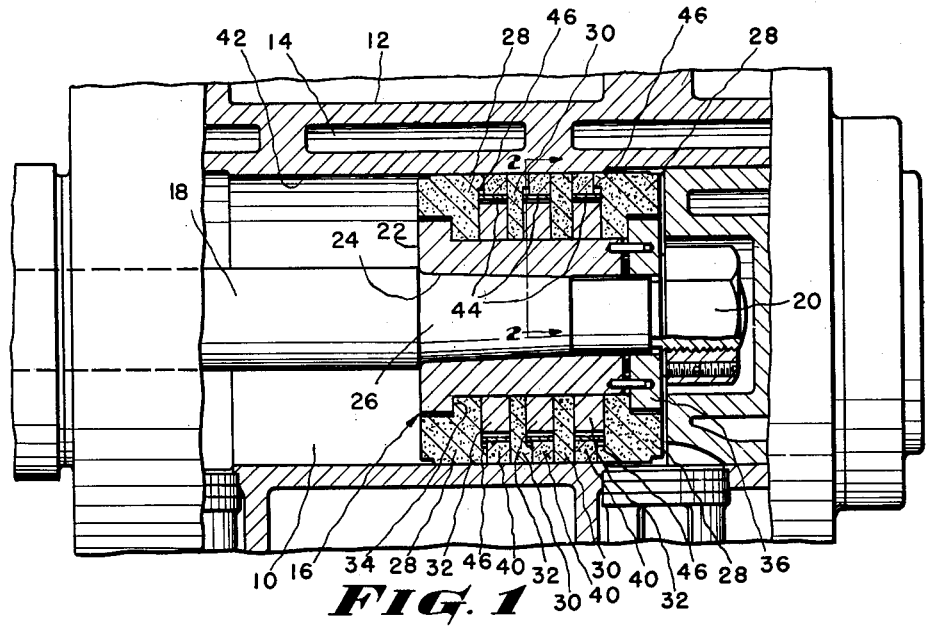
Figure 2:
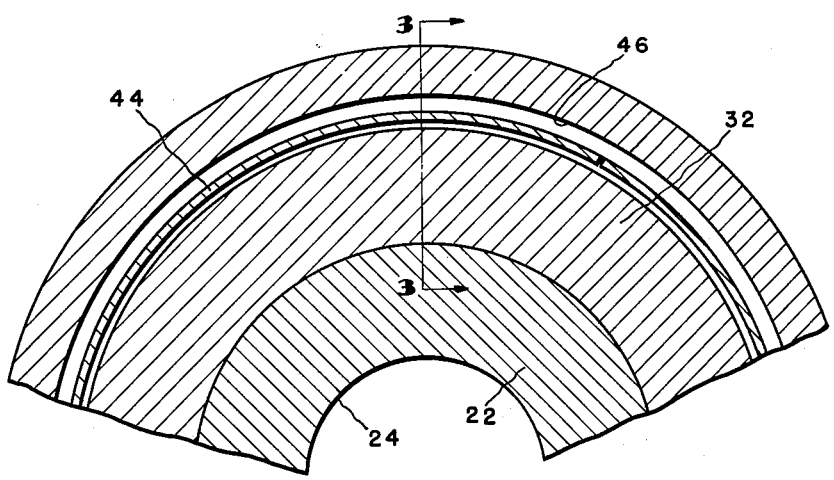
Figure 3:
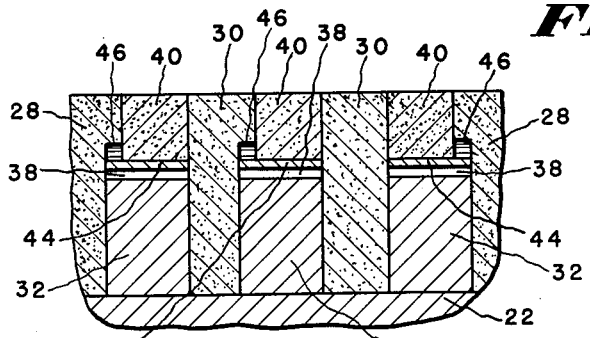

Figure 1 is a longitudinal view, partly in section, along the center line of the compressor cylinder, Fig. 2 is a view taken along the line 2—2, in Figure 1 looking in the direction of the arrows, and Fig. 3 is a sectional view taken along the line 3—3 in Fig. 2 looking in the direction of the arrows.

Referring now to the drawings for a detailed description of the applicant's invention, there is shown in Figure 1 the compressor cylinder 10 of a non-lubricated compressor. The cylinder 10 is defined by a casing 12 having cooling water chambers 14 therein. Situated within the cylinder 10 is a piston member 16 secured to a piston rod 18 by a piston nut 20. The piston member 16 is composed of a substantially cylindrical piston body 22 having a central bore 24 to receive a reduced section 26 of the piston rod 18 so as to be positioned thereon. Mounted on the terminal portions of the piston body 22 are a pair of carbon wearing rings 28 which, together with a plurality of spacer discs or rings 30—32 interposed between the wearing rings, form the outer peripheral portion of the piston member 16. The wearing rings 28 and spacer discs 30—32 are fixedly positioned between a flange 34 located at one end of the piston body 22 and a piston washer 36 located at the opposite end thereof.

In the preferred embodiment of the invention shown in the drawings the diameters of the spacer discs are varied so that one group 30 of discs has substantially the same diameter as the wearing rings while another group 32 of discs has a diameter substantially less than that of the wearing rings. The discs 30 consist of graphitic carbon and the discs 32 of any suitable metal. While the applicant shows two discs of the former group and three of the latter any suitable number may be employed as needed. The discs are alternately placed between the wearing rings 28 so that a smaller disc 32 abuts each wearing ring and is separated from its neighbor by a larger diameter carbon disc 30. In this manner a series of peripheral grooves 38 are formed in the piston member 16 and all of the fixed portions of the piston which engage or may come into engagement with the cylinder are constructed of carbon.

A carbon piston ring 40 resides in each of the grooves 38 formed by the spacer discs 30—32. The piston rings consist of a plurality of segments of a well known and suitable form and are in slidable engagement with the carbon members of the piston adjacent thereto. Their purpose is to secure sealing contact between the piston member 16 and the cylinder wall 42. In furtherance of this end metal expander rings 44 are placed in each groove 38 between the bottom of the groove and the piston ring 40 to urge the piston ring outwardly of the groove and into sealing contact with the cylinder wall. In order to prevent the expander rings 44 from scoring the cylinder wall 42 in the event that the piston rings 40 should wear out abutments 46 are provided on the outer edge of the wearing rings 28 and a spacer disc or discs 30. The abutments 46 extend into the grooves 38 so as to reduce the outermost opening of the groove until it is less than the width of the expander ring. If a piston ring should wear out the metal expander ring will be retained in the groove by the abutments.

While I have shown and described a specific form of my invention, it is to be understood that various changes and modifications may be made without departing from the spirit of the invention as set forth in the appended claims.

I claim:

1. A compressor piston comprising a piston body having carbon wearing rings mounted on the terminal portions thereof, a plurality of spacer discs on the piston body and between the wearing rings so as to form a series of peripheral grooves and alternate spacer discs consisting of carbon piston rings in the grooves, expander rings in the grooves to urge the piston rings outwardly of the grooves said expander rings having a width exceeding the width of the piston rings, and abutments on the wearing rings and carbon spacer discs at the outer edge of the grooves for engagement with the expander rings to retain said expander rings within the peripheral grooves.

2. A compressor piston comprising a piston body, carbon wearing rings on the ends of the body and constituting the terminal portions of the piston, carbon discs on the body of the same diameter as the wearing rings and cooperating with each other and with the wearing rings to define piston ring grooves for the piston, spacer discs on the body to hold the carbon discs in spaced relation with each other and with the wearing rings and forming bottoms for the ring grooves, carbon piston ring segments in the grooves in slidable engagement with the wearing rings and the carbon discs, and expander rings encircling the spacer discs to urge the piston ring segments outwardly in the ring grooves.

3. A compressor piston comprising a piston body, carbon wearing rings on the ends of the body and constituting the terminal portions of the piston, carbon discs on the body of the same diameter as the wearing rings and cooperating with each other and with the wearing rings to define piston ring grooves for the piston, spacer discs on the body to hold the carbon discs in spaced relation with each other and with the wearing rings and forming bottoms for the ring grooves, carbon piston ring segments in the grooves in slidable engagement with the wearing rings and the carbon discs, expander rings encircling the spacer discs to urge the piston ring segments outwardly in the ring grooves, and abutments on the wearing rings and one of the carbon discs for the expander rings to retain the expander rings in the grooves.

References Cited in the file of this patent

UNITED STATES PATENTS

| | | |
|---|---|---|
| 187,762 | Kelley | Feb. 27, 1877 |
| 2,092,086 | Saharoff | Sept. 7, 1937 |
| 2,092,087 | Saharoff | Sept. 7, 1937 |
| 2,105,950 | Metzgar | Jan. 18, 1938 |
| 2,153,025 | Rais | Apr. 4, 1939 |
| 2,456,529 | Naab | Dec. 14, 1948 |
| 2,557,497 | Carney | June 19, 1951 |
| 2,696,414 | Green | Dec. 7, 1954 |

FOREIGN PATENTS

| | | |
|---|---|---|
| 494,795 | Great Britain | Nov. 1, 1938 |